United States Patent
Qin et al.

(10) Patent No.: US 11,474,022 B2
(45) Date of Patent: Oct. 18, 2022

(54) ORE VOLUME-BASED ZONAL INJECTION METHOD FOR IONIC RARE EARTH ORE

(71) Applicant: JIANGXI UNIVERSITY OF SCIENCE AND TECHNOLOGY, Jiangxi (CN)

(72) Inventors: Lei Qin, Jiangxi (CN); Guanshi Wang, Jiangxi (CN); Chenliang Peng, Jiangxi (CN); Fangfang Xie, Jiangxi (CN); Shuo Zhang, Jiangxi (CN)

(73) Assignee: JIANGXI UNIVERSITY OF SCIENCE AND TECHNOLOGY, Jiangxi (CN)

( * ) Notice: Subject to any disclaimer, the term of this patent is extended or adjusted under 35 U.S.C. 154(b) by 273 days.

(21) Appl. No.: 16/886,779

(22) Filed: May 29, 2020

(65) Prior Publication Data
US 2020/0408661 A1    Dec. 31, 2020

(30) Foreign Application Priority Data
Jun. 26, 2019 (CN) .......................... 201910559667.8

(51) Int. Cl.
*G01N 15/08* (2006.01)
*C22B 59/00* (2006.01)

(52) U.S. Cl.
CPC ......... *G01N 15/0893* (2013.01); *C22B 59/00* (2013.01); *G01N 2015/0866* (2013.01)

(58) Field of Classification Search
CPC ............. G01N 15/0893; G01N 15/088; G01N 2015/0866; G06F 30/20; C22B 59/00; C22B 3/14; C22B 3/04
USPC .......................................... 356/601–623, 627
See application file for complete search history.

(56) References Cited

U.S. PATENT DOCUMENTS

2020/0199708 A1 * 6/2020 Wang ....................... C22B 3/14

* cited by examiner

*Primary Examiner* — Hoa Q Pham
(74) *Attorney, Agent, or Firm* — JCIP Global Inc.

(57) ABSTRACT

An ore volume-based zonal injection method for ionic rare earth includes six steps of ore body data acquisition; ore volume calculation by units; calculation of leaching agent consumption $\gamma$ per unit ore volume; calculation of unit ore volume-based zoning range difference; merging of the units into injection zones; and injection.

5 Claims, 2 Drawing Sheets

ORE VOLUME-BASED ZONAL INJECTION METHOD FOR IONIC RARE EARTH ORE

CROSS-REFERENCE TO RELATED APPLICATION

This application claims the priority benefit of China application serial no. 201910559667.8, filed on Jun. 26, 2019. The entirety of the above-mentioned patent application is hereby incorporated by reference herein and made a part of this specification.

FIELD

The present invention relates to optimization of a leaching agent injection technology in the mining of ionic rare earth ore, in particular to an ore volume-based zonal injection method for ionic rare earth ore.

BACKGROUND

Ionic rare earth ore is precious mineral resources existing on clay minerals through ion adsorption. When clay minerals adsorbed with rare earth ions encounter an electrolyte solution, the rare earth ions can be exchanged by ions with more active chemical property in the electrolyte solution. This feature of ionic rare earth promotes the formation, development and improvement of an ionic rare earth leaching process. The contradiction between increasing demand for rare earths and decreasing reserves of resources, as well as the requirement for a balance between resource acquisition and environmental protection, forces the continuous development of the ionic rare earth mining technology.

The ionic rare earth ore is the strategic resource in China. The extensive and predatory mining mode in the past is inadvisable and unsustainable, and the ionic rare earth ore extraction process should focus on two important objectives, i.e., high efficiency and environmental protection. At present, the processes of in-situ leaching for ionic rare earth ore and heap leaching for partial mines overlaid with construction projects are mostly implemented by experience. For example, injection in in-situ leaching is generally carried out according to the "three first" principle of "first top and then bottom", "first thick and then thin" and "first liquid and then water", and fail to make adjustment on the amount of a leaching agent according to the difference in ore volume per unit area of the ore body, often resulting in overuse of the leaching agent to cause excessive ammonia nitrogen in the ore soil of some zones of the whole ore body, and insufficient exploitation of rare earth resources in some other zones are caused due to the underuse of the leaching agent to result in resource loss. In order to increase the leaching rate of resources, the injection amount of the leaching agent is often increased, which increases the production cost on the one hand, and increases the residual amount of the leaching agent on the other hand, further aggravating environmental pollution. Therefore, it is necessary to optimize the injection process during ionic rare earth ore leaching, and propose an optimized process of zonal injection of an ionic rare earth ore leaching agent, so as to improve the recovery of the rare earth resources in ore bodies and alleviate environmental pollution.

The leaching process of the ionic rare earth ore is essentially an adsorption and desorption process. The dosage of the leaching agent depends on the cation exchange capacity of the ore and the volume of the ore. For the same ore body, ore properties are believed to be similar, that is, cation exchange capacities are the same, so that the dosage of the leaching agent for this ore body is only related to the volume of the ore. Therefore, as long as the ore volume per unit area of the ore body is known, the dosage of the leaching agent and injection time can be obtained. Therefore, a research direction is provided for solving the problems of insufficient leaching and excessive leaching of the ionic rare earth ore, as well as reasonably controlling the dosage of the leaching agent, i.e., the dosage of the leaching agent in the mining process should be determined according to the actual situation of the ore volume per unit area of the ore body.

SUMMARY

The present invention aims to provide an ore volume-based zonal injection method for ionic rare earth ore, so as to achieve the objectives of optimizing injection, increasing the leaching rate, reducing the dosage of a leaching agent and alleviating environmental pollution in the mining of ionic rare earth ore.

According to the technical solution of the present invention, an ore volume-based zonal injection method for ionic rare earth ore includes the following steps:

step 1, acquiring ore body data:

testing the topography of an ore body, and carrying out prospecting on the ore body to obtain coordinates of prospecting holes and grade distribution, and testing a saturation permeability coefficient K of the ore body, a pore ratio e of the ore body and a cation exchange capacity CEC of ore;

step 2, calculating ore volumes by units:

dividing a mining zone into several units with a unit area of 1 m×1 m~20 m×20 m, and calculating ore volumes and actual coordinate values of the units respectively;

step 3, calculating leaching agent consumption γ per unit ore volume:

using the ore on site to prepare ore samples, carrying out a column leaching test, preparing ore pillars with five 10 kg ore samples according to the pore ratio e, preparing leaching agent solutions according to the leaching agent consumption γ per unit ore volume: 3 kg/m$^3$, 4 kg/m$^3$, 5 kg/m$^3$, 6 kg/m$^3$ and 7 kg/m$^3$ respectively, then carrying out injection, continuing to inject backwater after leaching agent injection, collecting a mother liquid every other 50 ml, testing rare earth concentration, calculating leaching rates of the five ore pillars, making a trend curve of the leaching rate and the leaching agent consumption γ per unit ore volume, selecting an estimated leaching rate for a project, and obtaining the leaching agent consumption γ per unit ore volume under the estimated leaching rate;

step 4, calculating unit ore volume-based zoning range difference:

calculating injection strength Q according to the saturation permeability coefficient K of the ore body and a formula (1), wherein a is a coefficient which is 0.2~0.8; and calculating a unit ore volume-based zoning range difference ΔV according to a formula (2), wherein C is leaching agent concentration, γ is leaching agent consumption per unit ore volume, and S is an unit area;

$$Q = a^* K \tag{1}$$

$$\Delta V = \frac{Q^* C}{\gamma} * S; \tag{2}$$

step 5, merging the units into injection zones:

dividing injection zones i−[$V_{max}$−i*$\Delta V$, $V_{max}$−(i−1)*$\Delta V$] by taking a maximum ore volume $V_{max}$ in the units as a starting point and $\Delta V$ as the unit ore volume-based zoning range difference, wherein i is a zone number which is a natural number 1, 2, 3, . . . ; and merging the units into the injection zones according to the ore volumes; and step 6, carrying out injection:

based on the injection zones divided in the step 5, sequentially opening an injection hole in each zone for injection according to the leaching agent consumption γ per unit ore volume, the leaching agent concentration C and the injection strength Q, injecting backwater after injection of the leaching agent solutions, and ending injection when the rare earth concentration in the mother liquid indicates no recovery value.

The concentration of the leaching agent solutions is 10~30 g/L.

A pH value of the backwater is 4.5~5.

The estimated leaching rate for the project is 85~95%.

The rare earth concentration with no recovery value in the mother liquid is less than or equal to 0.1 g/L.

By means of the method, the current mining situation of "extensive" mining and excessive leaching by the "one method fitting all" approach which does not take into account the zonal features of the ore body can be changed, and the unscientific injection mode characterized by "first top and then bottom" and "experience dependence" is also changed. The dosage of the leaching agent can be dynamically controlled according to the ore volumes in different zones of the same ore body, thereby not only reducing the consumption of raw and auxiliary materials and increasing the leaching rate (3.57% in the embodiment), but also controlling the usage of the leaching agent and alleviating environmental pollution, and further providing reliable basis for digitalized mines.

DETAILED DESCRIPTION OF THE EMBODIMENTS

In the present invention, on the premise that a zone with a large ore volume needs a larger amount of leaching agent and a zone with a small ore volume needs a smaller amount of leaching agent, the ore volume that can be processed per unit time is determined according to leaching agent consumption per unit ore obtained from a laboratory test, in combination with leaching agent concentration and the injection strength of an ore body, which is taken as an ore volume-based zoning range difference. According to crude ore prospecting results, the ore body is divided into a plurality of units, and the units with similar ore volumes are merged into a plurality of injection zones on the basis of the ore volume-based zoning range difference, so that simultaneous injection is realized for the same injection zone, and injection is separately carried out for different injection zones according to the ore volumes, thus achieving the objectives of optimizing injection, increasing the leaching rate, reducing the dosage of the leaching agent and alleviating environmental pollution in ionic rare earth ore mining.

Figure 1:
FIG. 1 is a contour map of an ore body I in a rare earth mining zone according to an embodiment of the present invention.
Figure 2:
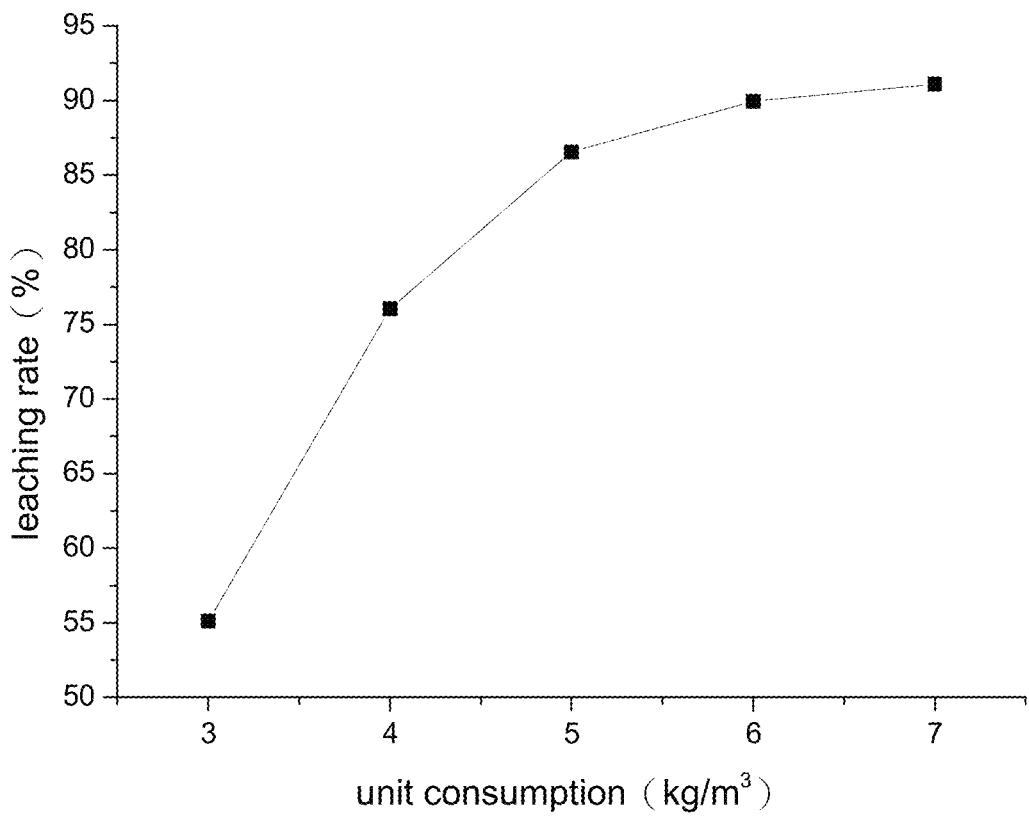
FIG. 2 is a trend chart of leaching agent consumption and a leaching rate per unit ore volume in a column leaching test according to an embodiment of the present invention.

An undisclosed experiment is carried out in a rare earth mining zone by means of the method of the present invention, and the specific steps of the embodiment are as follows:

step 1, acquiring ore body data:

as shown in FIG. 1, testing the topography of an ore body I to obtain a topographic contour map of the ore body, and carrying out prospecting on zones numbered Z002, Z003, Z202, Z203, Z204, Z205, Z101 and Z602 in FIG. 1 to obtain coordinates and grade distribution, wherein a saturation permeability coefficient of the ore body was 0.5 m/d, a pore ratio of the ore body is 0.79, and a cation exchange capacity of ore was 6.72 cmol/kg;

step 2, calculating ore volumes by units:

dividing the ore body into several units with a unit area of 5 m×5 m, and calculating ore volumes and actual coordinate values of the units respectively, shown in Table 1;

step 3, calculating leaching agent consumption γ per unit ore volume:

using the ore on site to prepare ore samples with a cation exchange capacity of 6.72 cmol/kg, carrying out a column leaching test, preparing ore pillars with five 10 kg ore samples according to the pore ratio of 0.79, preparing ammonium sulfate leaching agent solutions with concentration of 20 g/L according to the leaching agent consumption γ per unit ore volume (3 kg/m$^3$, 4 kg/m$^3$, 5 kg/m$^3$, 6 kg/m$^3$ and 7 kg/m$^3$) respectively, then carrying out injection, injecting backwater with a pH value of 5 after leaching agent injection, collecting a mother liquid every other 50 ml, testing rare earth concentration, calculating leaching rates of the five ore pillars to be 55.11%, 76.03%, 86.45%, 89.94% and 91.11% respectively, and making a trend curve of the leaching rate and unit consumption, shown in FIG. 2, wherein an estimated leaching rate for a project was 85%, and the leaching agent consumption per unit ore volume under the leaching rate was 5 kg/m$^3$;

step 4, calculating unit ore volume-based zoning range difference:

calculating injection strength Q to be 0.2 m/d according to a formula (1) when the saturation permeability coefficient K of the ore body was 0.5 m/d and a was 0.4, and calculating the unit ore volume-based zoning range difference $\Delta V$ to be 20 m$^3$ per piece according to a formula (2) when leaching agent injection concentration C was 20 g/L, the unit consumption γ of the leaching agent was 5 kg/m$^3$, and a unit area S was 25 m$^2$ per piece;

step 5, merging the units into injection zones:

dividing injection zones by taking a unit numbered 25 as a starting point, the unit ore volume as 479.2884 m$^3$ per piece, and the unit ore volume-based zoning range difference as 20 m$^3$ per piece, and merging the units into different injection zones, shown in Table 2; and step 6, carrying out injection:

based on the injection zones divided in the step 5, newly opening injection holes for injection according to the leaching agent consumption being 5 kg/m$^3$ per unit ore volume, the leaching agent ammonium sulfate solution concentration being 20 g/L and the injection strength being 0.2 m/d, and injecting backwater with a pH value of 5 after injection of the leaching agent ammonium sulfate solutions, and ending injection when the rare earth concentration in the mother liquid reached 0.1 g/L, wherein based on statistics of the mother liquid concentration, the leaching rate of the ore body I was 88.81%.

Comparison result: for an ore body III in the same mining zone, the leaching agent consumption per unit ore volume was 5 kg/m$^3$, an ammonium sulfate solution with a concentration of 20 g/L was adopted for injection, the current method of sequential injection from top to bottom was adopted, and the leaching rate of the ore body III was 85.24% through statistics; and for the ore body I adopting the injection method of the present invention, the leaching rate was 88.81% through statistics, 3.57% higher than the prior art under the same unit consumption of the leaching agent.

TABLE 1 unit distribution of ore body I (X is longitude and Y is latitude)

| Unit number | Unit ore soil volume range (m$^3$) | X | Y |
|---|---|---|---|
| 1 | 298.8624 | 2979943.525 | 40402012.03 |
| 2 | 342.1873 | 2979943.525 | 40402017.03 |
| 3 | 375.9365 | 2979943.525 | 40402022.03 |
| 4 | 370.6516 | 2979948.525 | 40402017.03 |
| 5 | 413.0932 | 2979948.525 | 40402022.03 |
| 6 | 433.6393 | 2979948.525 | 40402027.03 |
| 7 | 429.8008 | 2979948.525 | 40402032.03 |
| 8 | 414.0984 | 2979948.525 | 40402037.03 |
| 9 | 394.0934 | 2979948.525 | 40402042.03 |
| 10 | 372.0746 | 2979948.525 | 40402047.03 |
| 11 | 348.3969 | 2979948.525 | 40402052.03 |
| 12 | 266.1488 | 2979948.525 | 40402067.03 |
| 13 | 450.4535 | 2979953.525 | 40402022.03 |
| 14 | 474.7395 | 2979953.525 | 40402027.03 |
| 15 | 455.795 | 2979953.525 | 40402032.03 |
| 16 | 432.7676 | 2979953.525 | 40402037.03 |
| 17 | 410.2253 | 2979953.525 | 40402042.03 |
| 18 | 388.0689 | 2979953.525 | 40402047.03 |
| 19 | 365.5453 | 2979953.525 | 40402052.03 |
| 20 | 341.8309 | 2979953.525 | 40402057.03 |
| 21 | 316.6467 | 2979953.525 | 40402062.03 |
| 22 | 291.4054 | 2979953.525 | 40402067.03 |
| 23 | 270.1 | 2979953.525 | 40402072.03 |
| 24 | 454.2915 | 2979958.525 | 40402022.03 |
| 25 | 479.2884 | 2979958.525 | 40402027.03 |
| 26 | 459.2624 | 2979958.525 | 40402032.03 |
| 27 | 437.6038 | 2979958.525 | 40402037.03 |
| 28 | 417.5841 | 2979958.525 | 40402042.03 |
| 29 | 398.7609 | 2979958.525 | 40402047.03 |
| 30 | 380.1464 | 2979958.525 | 40402052.03 |
| 31 | 360.5099 | 2979958.525 | 40402057.03 |
| 32 | 338.9326 | 2979958.525 | 40402062.03 |
| 33 | 316.0877 | 2979958.525 | 40402067.03 |
| 34 | 294.4996 | 2979958.525 | 40402072.03 |
| 35 | 439.5219 | 2979963.525 | 40402027.03 |
| 36 | 437.9601 | 2979963.525 | 40402032.03 |
| 37 | 427.3322 | 2979963.525 | 40402037.03 |
| 38 | 415.0152 | 2979963.525 | 40402042.03 |
| 39 | 402.8655 | 2979963.525 | 40402047.03 |
| 40 | 390.7679 | 2979963.525 | 40402052.03 |
| 41 | 377.3647 | 2979963.525 | 40402057.03 |
| 42 | 360.1659 | 2979963.525 | 40402062.03 |
| 43 | 338.4967 | 2979963.525 | 40402067.03 |
| 44 | 315.6598 | 2979963.525 | 40402072.03 |
| 45 | 398.1815 | 2979968.525 | 40402027.03 |
| 46 | 406.3388 | 2979968.525 | 40402032.03 |
| 47 | 406.8038 | 2979968.525 | 40402037.03 |
| 48 | 403.9619 | 2979968.525 | 40402042.03 |
| 49 | 400.1077 | 2979968.525 | 40402047.03 |
| 50 | 396.0596 | 2979968.525 | 40402052.03 |
| 51 | 391.2047 | 2979968.525 | 40402057.03 |
| 52 | 380.0328 | 2979968.525 | 40402062.03 |
| 53 | 357.3335 | 2979968.525 | 40402067.03 |
| 54 | 337.6113 | 2979973.525 | 40402022.03 |
| 55 | 357.5758 | 2979973.525 | 40402027.03 |
| 56 | 371.7849 | 2979973.525 | 40402032.03 |
| 57 | 381.008 | 2979973.525 | 40402037.03 |
| 58 | 386.9006 | 2979973.525 | 40402042.03 |
| 59 | 390.8835 | 2979973.525 | 40402047.03 |
| 60 | 393.9819 | 2979973.525 | 40402052.03 |
| 61 | 397.0048 | 2979973.525 | 40402057.03 |
| 62 | 395.5674 | 2979973.525 | 40402062.03 |
| 63 | 368.1226 | 2979973.525 | 40402067.03 |
| 64 | 297.0282 | 2979978.525 | 40402022.03 |
| 65 | 317.614 | 2979978.525 | 40402027.03 |
| 66 | 336.7833 | 2979978.525 | 40402032.03 |
| 67 | 353.2177 | 2979978.525 | 40402037.03 |
| 68 | 366.4766 | 2979978.525 | 40402042.03 |
| 69 | 376.7018 | 2979978.525 | 40402047.03 |
| 70 | 384.1155 | 2979978.525 | 40402052.03 |
| 71 | 388.0078 | 2979978.525 | 40402057.03 |
| 72 | 383.499 | 2979978.525 | 40402062.03 |
| 73 | 366.6055 | 2979978.525 | 40402067.03 |
| 74 | 302.9008 | 2979983.525 | 40402032.03 |
| 75 | 326.0722 | 2979983.525 | 40402037.03 |
| 76 | 345.6347 | 2979983.525 | 40402042.03 |
| 77 | 360.6417 | 2979983.525 | 40402047.03 |
| 78 | 370.6443 | 2979983.525 | 40402052.03 |
| 79 | 374.7443 | 2979983.525 | 40402057.03 |
| 80 | 371.1602 | 2979983.525 | 40402062.03 |
| 81 | 272.3888 | 2979988.525 | 40402032.03 |
| 82 | 302.5468 | 2979988.525 | 40402037.03 |
| 83 | 327.6461 | 2979988.525 | 40402042.03 |
| 84 | 346.338 | 2979988.525 | 40402047.03 |
| 85 | 358.1995 | 2979988.525 | 40402052.03 |
| 86 | 363.0361 | 2979988.525 | 40402057.03 |
| 87 | 360.7471 | 2979988.525 | 40402062.03 |
| 88 | 286.3325 | 2979993.525 | 40402037.03 |
| 89 | 315.8013 | 2979993.525 | 40402042.03 |
| 90 | 336.8788 | 2979993.525 | 40402047.03 |
| 91 | 349.6051 | 2979993.525 | 40402052.03 |
| 92 | 354.6677 | 2979993.525 | 40402057.03 |
| 93 | 352.9665 | 2979993.525 | 40402062.03 |
| 94 | 345.608 | 2979993.525 | 40402067.03 |
| 95 | 334.0072 | 2979993.525 | 40402072.03 |
| 96 | 281.1508 | 2979998.525 | 40402037.03 |
| 97 | 312.8061 | 2979998.525 | 40402042.03 |
| 98 | 334.3856 | 2979998.525 | 40402047.03 |
| 99 | 346.2766 | 2979998.525 | 40402052.03 |
| 100 | 350.2998 | 2979998.525 | 40402057.03 |
| 101 | 348.1144 | 2979998.525 | 40402062.03 |
| 102 | 341.015 | 2979998.525 | 40402067.03 |
| 103 | 330.2232 | 2979998.525 | 40402072.03 |
| 104 | 316.9331 | 2979998.525 | 40402077.03 |
| 105 | 302.1875 | 2979998.525 | 40402082.03 |
| 106 | 288.3336 | 2980003.525 | 40402037.03 |
| 107 | 319.8525 | 2980003.525 | 40402042.03 |
| 108 | 339.7021 | 2980003.525 | 40402047.03 |
| 109 | 348.2455 | 2980003.525 | 40402052.03 |
| 110 | 349.6974 | 2980003.525 | 40402057.03 |
| 111 | 346.019 | 2980003.525 | 40402062.03 |
| 112 | 338.2898 | 2980003.525 | 40402067.03 |
| 113 | 327.4922 | 2980003.525 | 40402072.03 |
| 114 | 314.6117 | 2980003.525 | 40402077.03 |
| 115 | 300.5343 | 2980003.525 | 40402082.03 |
| 116 | 285.9142 | 2980003.525 | 40402087.03 |
| 117 | 271.1607 | 2980008.525 | 40402032.03 |
| 118 | 304.4619 | 2980008.525 | 40402037.03 |
| 119 | 334.8474 | 2980008.525 | 40402042.03 |
| 120 | 350.8997 | 2980008.525 | 40402047.03 |
| 121 | 353.5225 | 2980008.525 | 40402052.03 |
| 122 | 351.7682 | 2980008.525 | 40402057.03 |
| 123 | 346.1436 | 2980008.525 | 40402062.03 |
| 124 | 337.2492 | 2980008.525 | 40402067.03 |
| 125 | 325.8597 | 2980008.525 | 40402072.03 |
| 126 | 312.8748 | 2980008.525 | 40402077.03 |
| 127 | 299.1517 | 2980008.525 | 40402082.03 |
| 128 | 285.2585 | 2980008.525 | 40402087.03 |
| 129 | 271.392 | 2980008.525 | 40402092.03 |
| 130 | 242.6298 | 2980013.525 | 40402017.03 |
| 131 | 253.9952 | 2980013.525 | 40402022.03 |
| 132 | 273.481 | 2980013.525 | 40402027.03 |
| 133 | 298.0996 | 2980013.525 | 40402032.03 |
| 134 | 323.648 | 2980013.525 | 40402037.03 |
| 135 | 345.982 | 2980013.525 | 40402042.03 |
| 136 | 357.8306 | 2980013.525 | 40402047.03 |

TABLE 1-continued unit distribution of ore body I (X is longitude and Y is latitude)

| Unit number | Unit ore soil volume range (m³) | X | Y |
|---|---|---|---|
| 137 | 359.1088 | 2980013.525 | 40402052.03 |
| 138 | 355.3382 | 2980013.525 | 40402057.03 |
| 139 | 347.9646 | 2980013.525 | 40402062.03 |
| 140 | 337.6921 | 2980013.525 | 40402067.03 |
| 141 | 325.2844 | 2980013.525 | 40402072.03 |
| 142 | 311.7298 | 2980013.525 | 40402077.03 |
| 143 | 298.1045 | 2980013.525 | 40402082.03 |
| 144 | 284.9846 | 2980013.525 | 40402087.03 |
| 145 | 273.3439 | 2980018.525 | 40402012.03 |
| 146 | 280.7642 | 2980018.525 | 40402017.03 |
| 147 | 292.5993 | 2980018.525 | 40402022.03 |
| 148 | 308.5567 | 2980018.525 | 40402027.03 |
| 149 | 326.7559 | 2980018.525 | 40402032.03 |
| 150 | 344.4149 | 2980018.525 | 40402037.03 |
| 151 | 358.345 | 2980018.525 | 40402042.03 |
| 152 | 365.4762 | 2980018.525 | 40402047.03 |
| 153 | 365.4539 | 2980018.525 | 40402052.03 |
| 154 | 360.243 | 2980018.525 | 40402057.03 |
| 155 | 351.3422 | 2980018.525 | 40402062.03 |
| 156 | 339.6282 | 2980018.525 | 40402067.03 |
| 157 | 325.8631 | 2980018.525 | 40402072.03 |
| 158 | 311.1611 | 2980018.525 | 40402077.03 |
| 159 | 297.3545 | 2980018.525 | 40402082.03 |
| 160 | 294.1516 | 2980023.525 | 40402002.03 |
| 161 | 299.9792 | 2980023.525 | 40402007.03 |
| 162 | 307.7152 | 2980023.525 | 40402012.03 |
| 163 | 317.7448 | 2980023.525 | 40402017.03 |
| 164 | 329.9263 | 2980023.525 | 40402022.03 |
| 165 | 343.3248 | 2980023.525 | 40402027.03 |
| 166 | 356.3781 | 2980023.525 | 40402032.03 |
| 167 | 367.3374 | 2980023.525 | 40402037.03 |
| 168 | 374.5496 | 2980023.525 | 40402042.03 |
| 169 | 376.8074 | 2980023.525 | 40402047.03 |
| 170 | 373.9776 | 2980023.525 | 40402052.03 |
| 171 | 366.8699 | 2980023.525 | 40402057.03 |
| 172 | 356.421 | 2980023.525 | 40402062.03 |
| 173 | 343.3345 | 2980023.525 | 40402067.03 |
| 174 | 328.1527 | 2980023.525 | 40402072.03 |
| 175 | 311.563 | 2980023.525 | 40402077.03 |
| 176 | 320.6708 | 2980028.525 | 40402002.03 |
| 177 | 329.8844 | 2980028.525 | 40402007.03 |
| 178 | 340.8594 | 2980028.525 | 40402012.03 |
| 179 | 353.3291 | 2980028.525 | 40402017.03 |
| 180 | 366.2862 | 2980028.525 | 40402022.03 |
| 181 | 378.0212 | 2980028.525 | 40402027.03 |
| 182 | 386.8743 | 2980028.525 | 40402032.03 |
| 183 | 392.0225 | 2980028.525 | 40402037.03 |
| 184 | 393.3025 | 2980028.525 | 40402042.03 |
| 185 | 390.7419 | 2980028.525 | 40402047.03 |
| 186 | 384.5559 | 2980028.525 | 40402052.03 |
| 187 | 375.1999 | 2980028.525 | 40402057.03 |
| 188 | 363.213 | 2980028.525 | 40402062.03 |
| 189 | 349.0743 | 2980028.525 | 40402067.03 |
| 190 | 357.8388 | 2980033.525 | 40402007.03 |
| 191 | 371.8054 | 2980033.525 | 40402012.03 |
| 192 | 387.0144 | 2980033.525 | 40402017.03 |
| 193 | 401.7421 | 2980033.525 | 40402022.03 |
| 194 | 412.9265 | 2980033.525 | 40402027.03 |
| 195 | 418.0261 | 2980033.525 | 40402032.03 |
| 196 | 417.459 | 2980033.525 | 40402037.03 |
| 197 | 413.0142 | 2980033.525 | 40402042.03 |
| 198 | 405.7912 | 2980033.525 | 40402047.03 |
| 199 | 396.2461 | 2980033.525 | 40402052.03 |
| 200 | 384.657 | 2980033.525 | 40402057.03 |
| 201 | 371.3116 | 2980033.525 | 40402062.03 |
| 202 | 417.4685 | 2980038.525 | 40402017.03 |
| 203 | 435.6025 | 2980038.525 | 40402022.03 |
| 204 | 448.2226 | 2980038.525 | 40402027.03 |
| 205 | 449.0366 | 2980038.525 | 40402032.03 |
| 206 | 441.8067 | 2980038.525 | 40402037.03 |
| 207 | 431.6938 | 2980038.525 | 40402042.03 |
| 208 | 420.2695 | 2980038.525 | 40402047.03 |
| Total | 74185.81 | | |

TABLE 2 injection time and zoning of ore body I

| Time (d) | Unit ore soil volume range (m³) | Unit number |
|---|---|---|
| 1 | 460-480 | 14, 25 |
| 2 | 440-460 | 13, 15, 24, 26, 204, 205, 206 |
| 3 | 420-440 | 6, 7, 16, 27, 35, 36, 37, 203, 207, 208 |
| 4 | 400-420 | 5, 8, 17, 28, 38, 39, 46, 47, 48, 49, 193, 194, 195, 196, 197, 198, 202 |
| 5 | 380-400 | 9, 18, 29, 30, 40, 45, 50, 51, 52, 57, 58, 59, 60, 61, 62, 70, 71, 72, 182, 183, 184, 185, 186, 192, 199, 200 |
| 6 | 360-380 | 3, 4, 10, 19, 31, 41, 42, 56, 63, 68, 69, 73, 77, 78, 79, 80, 86, 87, 152, 153, 154, 167, 168, 169, 170, 171, 180, 181, 187, 188, 191, 201 |
| 7 | 340-360 | 2, 11, 20, 53, 55, 67, 76, 84, 85, 91, 92, 93, 94, 99, 100, 101, 102, 109, 110, 111, 120, 121, 122, 123, 135, 136, 137, 138, 139, 150, 151, 155, 165, 166, 172, 173, 178, 179, 189, 190 |
| 8 | 320-340 | 32, 43, 54, 66, 75, 83, 90, 95, 98, 103, 108, 112, 113, 119, 124, 125, 134, 140, 141, 149, 156, 157, 164, 174, 176, 177 |
| 9 | 300-320 | 21, 33, 44, 65, 74, 82, 89, 97, 104, 105, 107, 114, 115, 118, 126, 142, 148, 158, 162, 163, 175 |
| 10 | 280-300 | 1, 22, 34, 64, 88, 96, 106, 116, 127, 128, 133, 143, 144, 146, 147, 159, 160, 161 |
| 11 | 260-280 | 12, 23, 81, 117, 129, 132, 145 |
| 12 | 240-260 | 130, 131 |

What is claimed is:

1. An ore volume-based zonal injection method for ionic rare earth ore, comprising the following steps:

step 1, acquiring an ore body data:

testing a topography of an ore body, and carrying out prospecting on the ore body to obtain coordinates of prospecting holes and grade distribution, and testing a saturation permeability coefficient K of the ore body, a pore ratio e of the ore body and a cation exchange capacity of the ore body;

step 2, calculating ore volumes by units for obtaining a unit per volume:

dividing different mining zones of the ore body into the units, wherein each unit of the units has a unit area with a value in a range of 1 to 400 (meter²), and calculating the unit per volume and actual coordinate values of the units respectively;

step 3, calculating leaching agent consumption γ per the unit ore volume:

using the ore on site to prepare ore samples, carrying out a column leaching test, preparing ore pillars with five 10 kg ore samples according to the pore ratio e, preparing leaching agent solutions according to the leaching agent consumptions γ per the unit ore volume: 3 kg/m³, 4 kg/m³, 5 kg/m³, 6 kg/m³ and 7 kg/m³ respectively, then carrying out injection, injecting backwater after leaching agent injection, collecting a mother liquid every other 50 ml from the ore samples with the leaching agent injection and the backwater injection, testing rare earth concentration, calculating leaching rates of the five ore pillars, making a trend curve of the leaching rates and the leaching agent consumption $\gamma$ per the unit ore volume, selecting an estimated leaching rate, and obtaining the leaching agent consumption $\gamma$ per the unit ore volume under the estimated leaching rate;

step 4, calculating a unit ore volume-based zoning range difference:

calculating injection strength Q on the basis of the saturation permeability coefficient K of the ore body according to a formula (1), wherein a in the formula (1) is a coefficient with a value which is in a range of 0.2 to 0.8 ; and calculating the unit ore volume-based zoning range difference $\Delta V$ according to a formula (2), wherein C is a leaching agent concentration, $\gamma$ is a leaching agent consumption per the unit ore volume, and S is the unit area;

$$Q = a^*K \quad (1)$$

$$\Delta V = \frac{Q^*C}{\gamma} *S; \quad (2)$$

step 5, merging the units into injection zones:

dividing injection zones i–[$V_{max}$–i*$\Delta V$, $V_{max}$–(i–1)*$\Delta V$] by taking a maximum ore volume $V_{max}$ in the units as a starting point and $\Delta V$ as the unit ore volume-based zoning range difference, wherein i is a zone number which is a natural number 1, 2, 3, . . . , and merging the units into the injection zones according to the ore volumes; and step 6, carrying out injection of the leaching agent solutions with a dosage:

based on the injection zones divided in the step 5, sequentially opening an injection hole in each zone for injection according to the leaching agent consumption $\gamma$ per the unit ore volume, the leaching agent concentration C and the injection strength Q, injecting backwater after injection of the leaching agent solutions, and ending injection when the rare earth concentration in the mother liquid indicates no recovery value, wherein the dosage of the leaching agent solutions is controlled according to the ore volumes in the different mining zones of the ore body.

2. The ore volume-based zonal injection method for the ionic rare earth ore according to claim 1, wherein the concentration of the leaching agent solution has a value in a range of 10 to 30 (gram/liter).

3. The ore volume-based zonal injection method for the ionic rare earth ore according to claim 1, wherein a pH value of the backwater has a value in a range of 4.5 to 5.

4. The ore volume-based zonal injection method for the ionic rare earth ore according to claim 1, wherein the estimated leaching rate for the project has a value in a range of 85% to 95%.

5. The ore volume-based zonal injection method for the ionic rare earth ore according to claim 1, wherein the rare earth concentration with no recovery value in the mother liquid is less than or equal to 0.1 g/L.

* * * * *